June 21, 1932.  A. G. CHAPMAN  1,863,651

APPARATUS AND METHOD FOR REMEDYING CROSS TALK

Filed Dec. 3, 1930  3 Sheets-Sheet 1

INVENTOR
A. G. Chapman
BY
ATTORNEY

June 21, 1932.  A. G. CHAPMAN  1,863,651
APPARATUS AND METHOD FOR REMEDYING CROSS TALK
Filed Dec. 3, 1930  3 Sheets-Sheet 2

INVENTOR
A. G. Chapman
BY
ATTORNEY

June 21, 1932.　　　A. G. CHAPMAN　　　1,863,651
APPARATUS AND METHOD FOR REMEDYING CROSS TALK
Filed Dec. 3, 1930　　　3 Sheets-Sheet 3
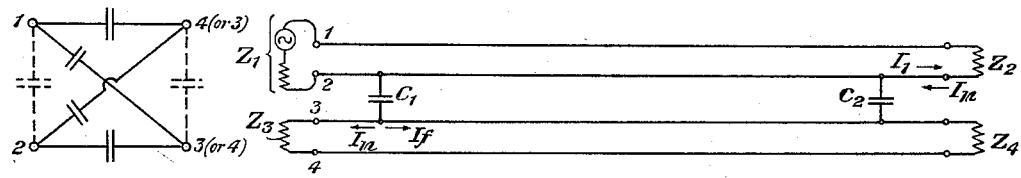
*Fig. 11*　　　*Fig. 12*
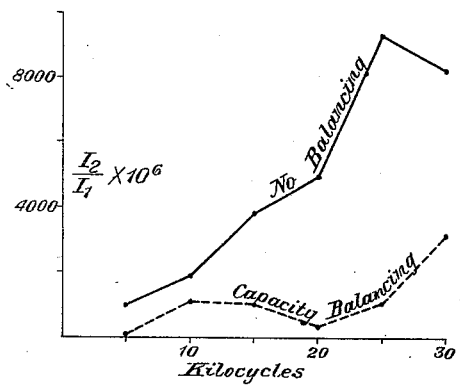
*Fig. 13*
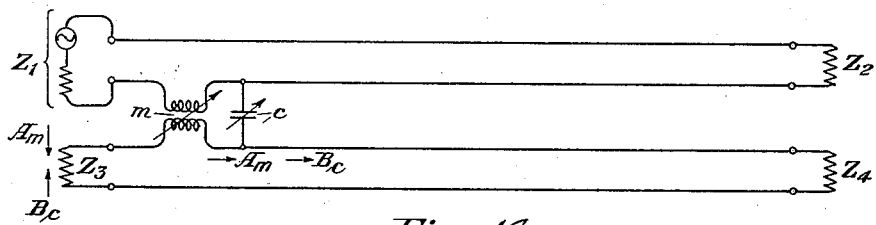
*Fig. 14*
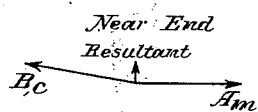　　　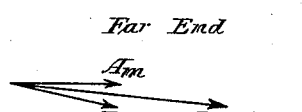
*Fig. 15*　　　*Fig. 16*
INVENTOR
*A. G. Chapman*
BY
ATTORNEY Patented June 21, 1932

1,863,651

UNITED STATES PATENT OFFICE

ARTHUR G. CHAPMAN, OF BUTLER, NEW JERSEY, ASSIGNOR TO AMERICAN TELEPHONE AND TELEGRAPH COMPANY, A CORPORATION OF NEW YORK

APPARATUS AND METHOD FOR REMEDYING CROSS TALK

Application filed December 3, 1930. Serial No. 499,775.

An object of my invention is to provide a method and suitable apparatus for eliminating crosstalk in signaling circuits. Another object is to correct for crosstalk in a system of transmission lines existing side by side. Other objects are to provide a system of transmission lines interrelated so as to reduce crosstalk and with suitable elements associated therewith further to reduce crosstalk. Still another object has relation to the procedure or method for suitable correction for crosstalk in such a system of lines. These objects and other objects of my invention will become apparent on consideration of a limited number of specific examples of practice according to the invention, which I will disclose in the following specification. It will be understood that this disclosure has relation primarily to these particular examples of the invention, and that the scope of the invention will be indicated in the appended claims.

Figure 1:
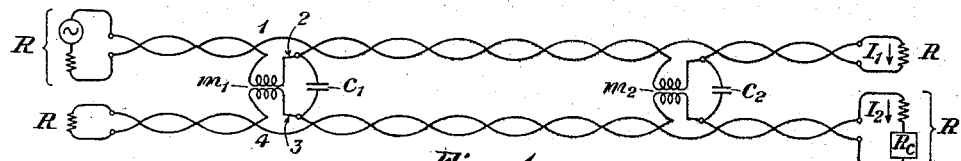
Figure 2:
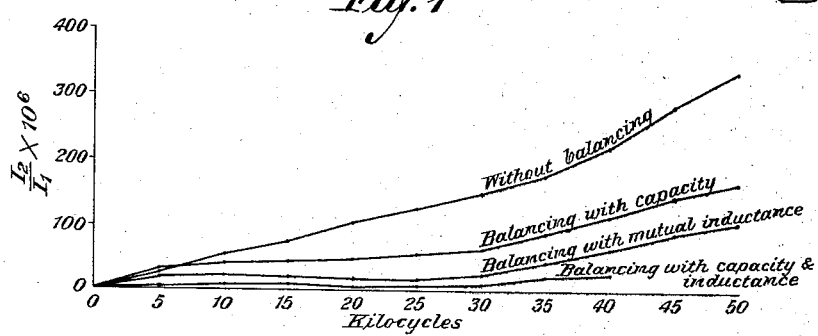
Figure 3:
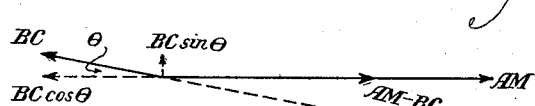
Figure 4:
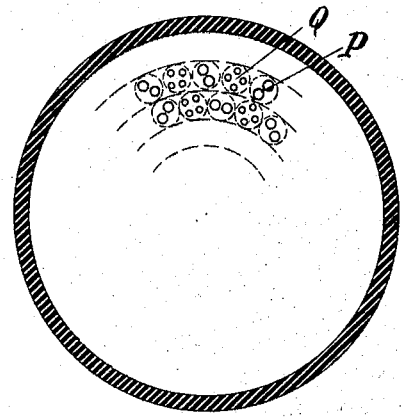
Figure 5:
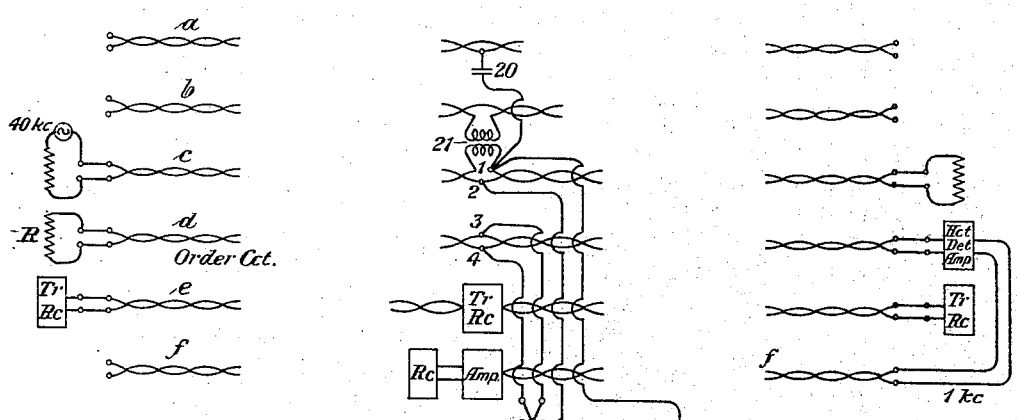
Figure 6:
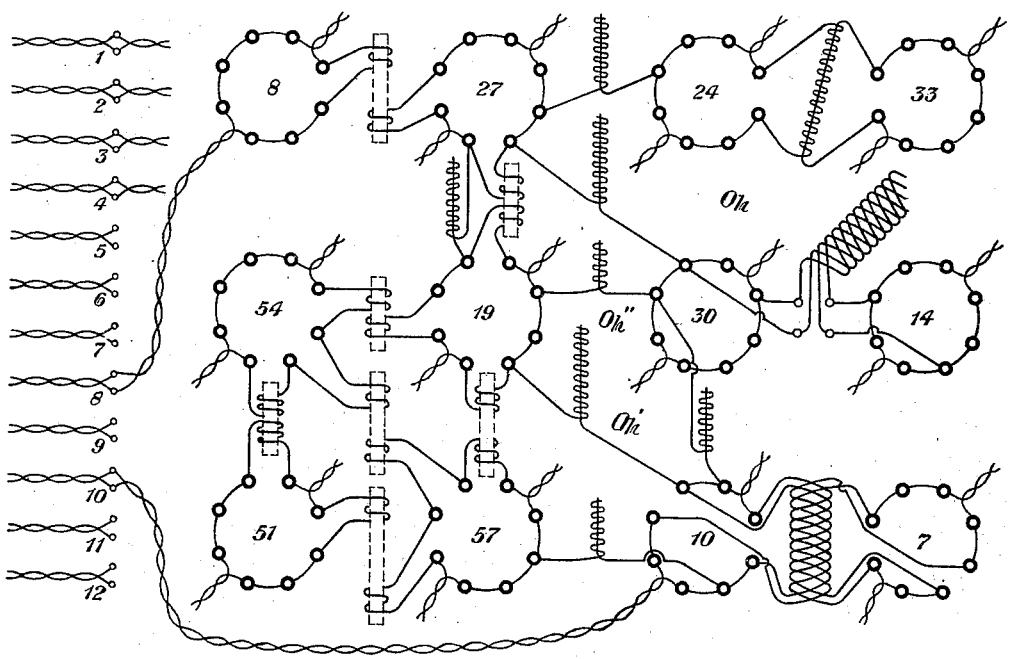
Figure 7:
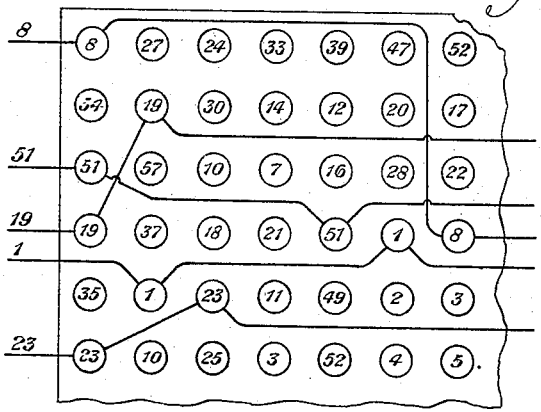
Figure 8:
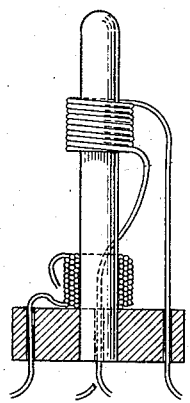
Figure 9:
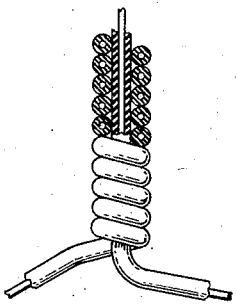
Figure 10:
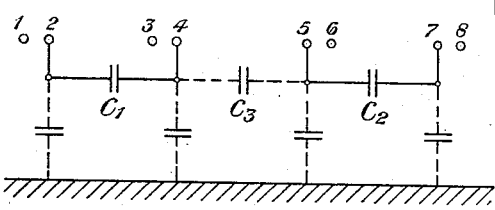

Referring to the drawings, Figure 1 is a diagram to show the nature of the coupling between two circuits that may give rise to crosstalk; Fig. 2 is a curve diagram showing the degree of crosstalk between two cable conductor pairs under various conditions; Fig. 3 is a vector diagram for crosstalk due to inductance and capacity coupling and showing how such crosstalk may be corrected by either inductance or capacity; Fig. 4 is a diagrammatic cross-section of a cable showing an arrangement of pairs and quads to lessen the crosstalk between the pairs; Fig. 5 is a general circuit diagram representing several conductor pairs of a cable and means to correct for crosstalk between the different pairs; Fig. 6 is a diagrammatic elevation of a panel that may be employed in the practice of my invention; Fig. 7 is a diagram corresponding to Fig. 6 but more extended and omitting certain details; Fig. 8 is a sectional elevation of a mutual inductance unit that may be employed; Fig. 9 is a sectional elevation of a mutual capacity unit; Fig. 10 is a diagram to illustrate how correction for crosstalk between certain circuits may introduce a degree of crosstalk between other circuits; Fig. 11 is a diagram showing how "spiral—4" capacity may be used in neutralizing crosstalk; Fig. 12 is a diagram of two circuits to illustrate the nature of crosstalk with certain impedance irregularities; Fig. 13 is a curve diagram showing the degree of improvement that may be attained for crosstalk in open wire lines; Fig. 14 is a diagram of two open wire circuits to show the nature of the crosstalk in such a case; Fig. 15 is a vector diagram for near-end crosstalk in Fig. 14 and Fig. 16 is a vector diagram for far-end crosstalk in Fig. 14.

When two signaling circuits extend close together, the existence of signaling currents in one circuit may have a tendency to set up corresponding currents in the other circuit; this phenomenon is called "crosstalk". The currents in one circuit may act to produce currents in the other circuit by mutual inductance between the two circuits or by mutual capacity, or both. The objectionable phenomenon may occur when two circuits extend side by side each in the form of a conductor pair within one and the same cable, or each in the form of an open wire line, both on the same row of poles. To obviate this tendency as in a cable, the two conductors of each pair are commonly twisted together so that the inductance and capacity effects of one conductor pair on neighboring pairs are for the most part balanced out. In open wire lines the conductors of each pair are systematically transposed so that the influence upon neighboring pairs and the influence from them, are for the most part balanced out. However, in many cases of long transmission lines either in cables or in open wire lines, in spite of the twisting or transposing of the conductors, there will be some accidental dissymmetries and therefore some degree of crosstalk between one circuit and another unless further corrective adjustment is made.

In one aspect, my invention relates to making compensating adjustments to remedy the crosstalk between the neighboring circuits of long cables or multiple open wire lines.

To illustrate the nature of my invention I will now give specific descriptions of the apparatus and the procedure for compensating for crosstalk between the conductor pairs of a long cable.

Referring to Fig. 1, this shows two conductor pairs or circuits in a cable which may be, say, twenty-five miles long. At each end there may be repeaters and further 25-mile cable lengths extending therefrom. By the twisting of each conductor pair in the 25-mile length of cable, most of the mutual inductance and mutual capacity between the two circuits will be canceled out. However, there will sometimes be a little unbalanced mutual inductance effect between the circuits which may be represented as at $m_1$ in Fig. 1, and likewise at the same place there may be a little unbalanced mutual capacity between the two circuits, represented by $c_1$. Whereas the couplings represented by $c_1$ and $m_1$ are toward the left, there may be such couplings anywhere along the length of the cable, as at $c_2$ and $m_2$ at the right. Assuming that signaling currents are transmitted from the left on the upper circuit, the couplings $c_1$, $m_1$, $c_2$ and $m_2$ will give rise to some small degree of corresponding currents induced in the lower circuit, which will become effective as crosstalk at the right hand end of the lower circuit. The magnitude of these received crosstalk currents will depend on the magnitude of the mutual inductance $m_1$ and the mutual capacity $c_1$. Assuming that the two circuits have the same electrical constants and are terminated each in its characteristic impedance R, the transmission paths from the sending end at the left of the upper pair to the receiving end at the right of the lower pair will have the same change in phase and the same attenuation factors for given values of $m_1$ and $c_1$ (or $m_2$ and $c_2$), no matter where these mutual reactances are located along the length of the two lines. But the attenuation factor will be dependent in magnitude on the magnitudes $m_1$ and $c_1$ (or $m_2$ and $c_2$).

The outstanding uncompensated mutual inductance and capacity that have been represented in Fig. 1 by $m_1$ and $c_1$ are assumed to lie between the conductor 2 of one pair and the conductor 3 of the other pair, but they might lie between 2 of one pair and 4 of the other pair. The two connections correspond to the two cases of crosstalk differing 180° in phase.

Subject to the assumption that the terminating impedances are correct, it will be seen from what has been said that all the distributed capacity couplings along the whole length of the two conductor pairs in Fig. 1 may be neutralized by a single capacity connected between the wire 2 of one pair and either the wire 3 or the wire 4 of the other pair, depending which direction of capacity coupling predominates between the two pairs. Likewise, all of the distributed mutual inductance couplings between the two pairs may be neutralized by a single mutual inductance. Crosstalk is measured by the ratio of the received current $I_2$ in the induced circuit to the received current $I_1$ in the direct circuit. In Fig. 2 I have plotted the crosstalk between two particular pairs of a cable twenty-five miles long. The plot is for various frequencies as abscissas, and the ordinates give the corresponding crosstalk ratios, each multiplied by a million. It will be seen that the crosstalk increases with frequency, as shown by the uppermost curve of Fig. 2. A substantial part of this crosstalk may be corrected by the interposition of a suitably chosen capacity between one side of one pair and one side of the other pair, as shown by the curve marked "Balancing with capacity". But, as Fig. 2 shows, a better correction may be obtained by balancing with a suitably chosen mutual inductance, and still better, by using both inductance and capacity.

Fig. 3 indicates the phase relation between the crosstalk current components at the receiving end of the disturbed circuit due to the net effective capacity coupling and the net effective mutual inductance coupling between the two circuits. For a given type of circuit and a given frequency, the crosstalk current is proportional to the mutual inductance coupling or the capacity coupling, as the case may be. Let M stand for mutual inductance and C for mutual capacity; then if A and B are suitable constants, AM indicates the total crosstalk current due to mutual inductance coupling and BC indicates the total crosstalk current due to capacity coupling. These two currents will be at the angle $180° - \theta$, where $\theta$ is twice the angle of the characteristic impedance at that frequency. $\theta$ is a small angle at the higher frequencies for which the crosstalk is greatest, and therefore it will be seen from Fig. 3 that mutual inductance may be used approximately to balance capacity as well as to balance mutual inductance. Fig. 3 serves to illustrate the equation $$I_2/I_1 = (AM - BC \cos \theta) + jBC \sin \theta.$$

From the diagram and the equation it will be seen that the total crosstalk current may be considered to have a component in phase with the mutual inductance crosstalk current and a small component at a right angle thereto. Thus, a single mutual inductance of magnitude $AM - BC \cos \theta$ may be used to eliminate all but this last mentioned small component. If mutual capacity is to be used for annulling the crosstalk, it must be represented by a vector lying along the direction of BC and of magnitude $AM \cos \theta - BC$. It is apparent that this will leave an unbalanced component of $AM \sin \theta$ which is larger than $BC \sin \theta$ which is left when mutual inductance is used for balancing. This is because AM is greater than BC, that is, because the unbalanced mutual inductance reactance is greater than the unbalanced mutual capacity reactance. In some cases it will be just the other way, that is, the crosstalk will be due more to unbalanced capacity than to unbalanced mutual inductance, and then it may be that a closer compensation of the crosstalk will be attained by the use of capacity instead of mutual inductance. In such a case the advantage will be on the side of using capacity, and as will be seen presently, there may be a practical advantage in using capacity even though the compensation that it will give is not quite as close as to use mutual inductance.

In the particular cable here presented by way of example, there will be a certain number of pairs and at least an equal number of quads. Each quad will consist of four conductors, constituting two pairs and providing a phantom circuit of which each pair forms one side. The single pairs are No. 16 gauge wire but the quads are of No. 19 gauge wire, so that the cross-sectional space occupied by a distinct pair or by a quad is substantially the same. The pairs will carry carrier current up to 40 kilocycles but the quads will carry lower frequencies, within the voice range. Since crosstalk increases with frequency (as shown in Fig. 2), the crosstalk between the pairs will be more serious than between the quads or than from quads to pairs. As to crosstalk from pairs to quads, this will be at the carrier frequency, which is so high that it will be inaudible in the quad circuits. As shown in Fig. 4, these pairs P and quads Q are assembled in the cable in coaxial layers, and in each layer the pairs and quads are alternated around the cable. The pairs and quads of each layer have a common helical twist around the axis of the cable and the direction of this twist alternates from layer to layer; that is, going out radially from the axis, the common helical twist of one layer around the axis of the cable will be right hand, the next left, the next right, and so on. Thus, the distinct pairs are separated to a great extent from each other by the quads, and thus the mutual inductance and capacity effects between one pair and another are considerably reduced.

In the particular cable which I have up for consideration by way of example, there are 68 such pairs and 70 quads. Whereas, each of the quads will carry three telephone conversations at voice frequency, the distinct pairs are intended to be used for carrier current service. The carrier current frequencies will lie within the range from a little above zero up to 40,000 cycles per second, and this frequency range will be apportioned to nine one-way telephone channels on each pair, the corresponding nine return channels being found in some other distinct pair or pairs.

Having shown how I reduce the tendency to cross-talk in the distinct pairs by disposing them in the cable in alternation with the quads, I will now go on and tell how I proceed to test for uncompensated crosstalk in the pairs and to make correction therefor.

As mentioned heretofore, in my illustrative example, I have a twenty-five mile length of cable comprising 68 conductor pairs, of which six are shown in Fig. 5. The ends of these conductors are accessible at each end of the cable, as shown. At the middle of the cable, that is, twelve and one-half miles from either end, I provide a panel and facilities for making the needed compensations at this point. The reason for locating this panel half-way will be discussed presently. The six conductor pairs of Fig. 3 may be distinguished, as $a$, $b$, $c$, $d$, $e$ and $f$. For the time being the conductor pair $e$ is appropriated for use as an order circuit, having a transmitter and a receiver at each end and at the middle. It is assumed that tests have been made in the manner presently to be described for crosstalk between the circuit $c$ and each of circuits $a$ and $b$, and that according to those tests the crosstalk between $c$ and $a$ has been compensated by the interposition of the condenser 20 and that the crosstalk between $c$ and $b$ has been compensated by introducing the mutual inductance 21. It is now desired to test for crosstalk between the circuit $c$ and the circuit $d$. Accordingly, the operator at the middle station directs the operator at the left to put his 40-kilocycle source on circuit $c$ and to put a resistance R on circuit $d$. This resistance R is substantially equal to the characteristic impedance of any one of the lines $a$, $b$, $c$, $d$ or $e$. Also, the assistant at the right is directed to put a similar resistance R on his end of the line $c$ and a heterodyne-detector-amplifier with input resistance R on his end of the line $d$. This heterodyne-detector-amplifier comprises a source at about 39 kilocycles which beats with the incoming disturbing crosstalk current of 40 kilocycles to give an output at about one kilocycle. The 40-kilocycle current is, of course, above the limit of audibility but the 1-kilocycle current is well within the range of audibility.

The operator at the middle station receives the 1-kilocycle current over the line $f$, and it is amplified and heard by him in the receiver Rc. He wears this receiver on one ear and the receiver of his order circuit on the other ear. The current in the pair $f$ gives no appreciable crosstalk current in receiver Rc because the detector-amplifier is tuned to 40 kilocycles.

The two circuits $c$ and $d$ may have so little crosstalk between them that no compensation will be needed, and this will be indicated by silence or very little noise in the receiver Rc. However, the operator does not rely on this indication but actually proceeds to make a measurement by means of the bridge shown in the lower part of Fig. 5. This is connected to the sides of the circuits $c$ and $d$ in the manner shown in the drawings. Adjustment is made at the outset for resistance and capacity at 4, so that with the capacity and resistance adjustments at 3 at zero on their scales, there will be no crosstalk if the lines are perfectly compensated. With this setting at 4, the operator can rely on the scales at 3 to give him the measure of the crosstalk between the lines connected to the bridge. Suppose that he gets silence in his receiver with zero adjustment at 3. This means that no capacity such as 20, or coil such as 21, is required between lines $c$ and $d$. But if the operator at the middle point gets a 1000-cycle tone in his receiver Rc with zero adjustment at 3, he then adjusts the resistance and the capacity at 3 until this tone practically vanishes. Then he reads on the scales at 3 the measure of the necessary capacity and the necessary resistance to compensate the crosstalk.

After the test has been made as described, and after compensation has been made accordingly as will be described, the operator at the middle point directs his assistants over the order circuit to change the connections of the 40-kilocycle oscillator and resistance R at one end, and the resistance R and the heterodyne-detector-amplifier at the other end, so as to make a similar test between some other pair of the conductor pairs; and so the testing and compensating goes on from pair to pair.

To facilitate making the tests and the resulting compensating adjustments, all the pairs of the cable such as $a$, $b$, $c$ and $d$ in Fig. 5 are brought to various positions on a panel at the half-way station, that is, twelve and one-half miles from either end on a twenty-five mile section of cable. A portion of this panel, its upper left-hand corner, is shown diagrammatically in Fig. 6. A few of the 68 pairs coming in from the left are shown at the left of Fig. 6, numbered 1 to 12. Each pair, such as 8 for example, goes to a position on the board numbered 8, where each conductor of the pair is normally carried through four studs on the face of the board, thus making eight studs for one postion of one pair. These eight studs or lugs are arranged at the vertices of a regular octagon, as shown in Fig. 6. The positions on the panel may be about 3 inches apart from center to center along the rows and columns, as for example from 8 to 27 or from 8 to 54, between centers.

Referring to Fig. 7, this is a diagram for the same upper left-hand corner of the board that is shown in Fig. 6 but with less detail and somewhat more extended.

Fig. 7 shows how each conductor pair may be carried from one position to another. Thus, the pair 19 goes to the first position marked 19, and then is carried on behind the board to another position marked 19, and then to others in sequence that are not shown in Fig. 7. The plan is to have the conductor pair 19 appear on the board at enough positions 19, so that all the other 67 conductor pairs may be found conveniently adjacent at one or another such position. For a reason that will be pointed out presently, positions diagonally above to the right and below to the left are not to be considered as conveniently adjacent. Accordingly, except for positions along the margin of the board, each pair in one position will have six other pairs conveniently adjacent. Thus, the pair numbered 1 near the lower left part of Fig. 7 is conveniently adjacent to the pairs numbered 35, 19, 37, 23, 25 and 10. Again, we see another position indicated near the right of Fig. 7 for the pair 1 and here the conveniently adjacent pairs are 51, 16, 28, 8, 3 and 2. Going on over the part of the board to the right, not shown in Fig. 7, the positions 1 are repeated enough times so that in at least one position the pair 1 will be conveniently adjacent to any particular other pair of the remaining 67 pairs.

Returning to Fig. 6, suppose that the test described in connection with Fig. 5 has been made between pairs 8 and 27 and it has been determined that the compensation for crosstalk will be effected best by the use of mutual inductance. Accordingly, the conductor between two consecutive lugs is cut out at position 8 (see Fig. 6), and likewise at the adjacent position 27, and the respective coils of a mutual inductance are connected to these pairs of lugs. One of the mutual inductance units, such as shown diagrammatically between 8 and 27 in Fig. 6, is shown in elevation in Fig. 8. This comprises a wooden pin a little less than a quarter inch in diameter, carrying two coils one of which may slide along the pin toward or from the other. The external diameter of each coil may be less than a half inch. One coil has its terminals connected in one side of the pair 8 and the other coil has its terminals connected in one side of the pair 27, and the adjustment for inductance is made by sliding one coil along the pin toward or from the other. The two coils can always be connected in the adjacent sides of the two pairs for if the sign of the mutual inductance is to be reversed, this is accomplished by slipping one coil off the pin and turning it over and replacing it.

Suppose that after the test made as described in connection with Fig. 5, it is decided that compensation for crosstalk is to be effected by the use of mutual capacity instead of mutual inductance. The operator has a supply of twisted pairs, such as shown in Fig. 9, with one conductor an axially straight insulated wire and the other conductor wound around it in a tight helix of outside diameter about a quarter inch. Having determined from the test how much capacity is needed, and knowing approximately what length of the twisted pair of Fig. 9 will give this capacity, the operator cuts off a length slightly in excess, spreads the conductors at one end and solders them to studs in the sides of the respective pairs; then gets a further adjustment by snipping off the free end of the twisted pair to bring it down to the proper length. Thus, in Fig. 6 positions are shown for the pairs 27 and 30, and a capacity is shown connected across between the neighboring conductors of these two pairs. If the correcting capacity reactance should be of opposite sign, then the connection must be made between the same conductor of one pair and the other conductor of the other pair. Thus, at the lower right hand part of Fig. 6 positions shown for pairs 10 and 30; here the correcting capacity is connected to the proximate conductor of pair 10 and the distant conductor of pair 30. Similarly between 10 and 57 the panel is provided with holes as at $h$, $h'$ and $h''$ in Fig. 6 to receive dowel pins between the adjacent positions. These pins may be used as supports for the compensating reactance elements, more particularly, the capacities may be tied to them with threads for support. The lengths of the twisted pair units for capacity may be from an inch or even less up to two feet or more. For the longer lengths these twisted pairs will be doubled or folded and tied in bundles to the pins.

Referring to Fig. 6, it will be seen that mutual inductance has been interposed between pair 54 and pair 57 below to the right. Similarly, capacity has been interposed between pair 27 and pair 30 below to the right. If it should be found desirable to interpose mutual inductance or capacity between pairs 51 and 19, or between 19 and 24, this would give a criss-cross disposition of the correcting elements which would be objectionable, not only for the crowding but for the more important reason that it would introduce undesired mutual reactance between other circuits such as 51 and 57, 54 and 19, 19 and 30 or 27 and 24.

Hence, the plan is followed not to introduce compensating reactances between positions above to the right and below to the left but to find the pairs elsewhere on the board in adjacent positions otherwise related.

In case it is desired to use both inductance and capacity for correction, this may be done as indicated between the pairs 27 and 19, in Fig. 6.

In testing and compensating for the crosstalk between the pairs of a cable such as considered in connection with Figs. 5 and 6, it may be found that, say, half or three-fourths of the pairs of circuits will not need any correction between them. Thus, referring to Fig. 6, it may be assumed that the test has been made between pair 8 and pair 54 and the crosstalk is so insignificant that no compensation is needed, and therefore no mutual inductance nor capacity appears in Fig. 6 between 8 and 54. After the cable has been tested and compensated, pair against pair, the work will ordinarily have been done once for all. But if repairs have to be made on the cable, for example if a section is replaced, it may then be necessary to repeat the tests on the panel of Fig. 6, and change the compensations in some cases; this can easily be done.

In general, as pointed out heretofore, somewhat closer correction is obtained by the use of inductance alone instead of capacity alone. On the other hand capacity is much more convenient because it does not require interrupting a conductor of a pair and requires soldering at only two points, whereas inductance requires interrupting one conductor of each pair and soldering the inductance coil terminals at four points. This distinction will be readily apparent in Fig. 6. Therefore, capacity will be used to a considerable extent to correct for the crosstalk because of its greater convenience and in spite of its being generally slightly less effective.

In some cases, however, for greater precision, mutual inductance will be used, as shown at several places on the left hand side of Fig. 6. And in some cases, for still greater precision, both mutual inductance and capacity will be used, as between pairs 27 and 19 in the upper part of Fig. 6.

To provide mutual inductance, twisted pairs may be used instead of the adjustable coils such as shown in Fig. 8, but the twisted pair has the disadvantage that no adjustment can be made without unsoldering one or more terminals. This practice is shown between positions 24 and 33 at the upper right hand part of Fig. 6.

In making compensation in any of the ways described heretofore, the compensating elements have been introduced with short leads or connections that do not come nearer other circuits than the ones between which the compensation is made. This is because it is desirable that the balancing units shall introduce mutual inductances and capacities only between the wires of the circuits to be balanced. Practically, however, this desideratum will not be attained to perfection, and other capacities and inductances will be introduced, as indicated in Fig. 10. Thus, in Fig. 10 there has been a deliberate introduction of compensating capacity between sides 2 and 4 of the respective pairs 1, 2 and 3, 4 and likewise compensating capacity $c_2$ between sides 5 and 7 of the respective pairs 5, 6 and 7, 8; if the two balancing twisted pair units represented by $c_1$ and $c_2$ are in close proximity, this will introduce some degree of undesired capacity represented by $c_3$ between the pairs 3, 4 and 5, 6. In addition, each of the intentionally introduced balancing twisted pair units will have a certain amount of unbalanced direct capacity to ground and therefore will tend to introduce noise effects and undesired crosstalk coupling.

The coils or twisted pairs used for introducing mutual inductance between any two circuits will also introduce some degree of unsymmetrical resistance and self-inductance and also some degree of undesired mutual inductances between a coil of one pair and a not-distant coil of another pair. These undesired inductance effects may occur whether twisted pairs or movable coils are used for the inductance units. The arrangement of the board shown in Figs. 6 and 7 is such as to keep these undesired capacities, inductances and resistances down to a practically harmless minimum. This is accomplished principally by keeping the balancing units reasonably separated from each other and from other conductors and by the use of short connecting leads by avoiding the use of very small wires in the balancing units so that their resistances shall not be of serious magnitude.

To reduce still further the undesired effects between circuits other than the two circuits between which adjustment is desired, a spiral—4 unit may be employed, as shown between positions 30 and 14 in Fig. 6. This consists of four conductors twisted together so that in cross-section their centers are at the corners of a square. Two of these conductors at the ends of one side of the square are connected respectively to the sides of one pair to be balanced, and the other two conductors of the spiral—4 are connected respectively to the two sides of the other pair to be balanced; but this last connection may need to be reversed.

Between the four conductors of the spiral—4 taken two by two there are, of course, six different capacities, all of which are indicated in Fig. 11. The capacity between 1 and 2 is simply added to the capacity which exists between the two sides of the pair 1, 2 and this added capacity is insignificant in comparison with the already existing capacity. Similarly for the capacity between 3 and 4. The capacities between 1 and 4 and between 2 and 3 are greater than between 1 and 3, and 2 and 4 because of the greater distance apart of the diagonally positioned wires. The spiral—4 unit employed as here indicated has the advantage that it introduces unbalances only between the two pairs to which it is connected and not between other pairs. The construction insures that all four wires have practically the same coupling to any other circuit or to ground. Since there are mutual inductances as well as capacities between the wires of the spiral—4 unit, it may be used for mutual inductance balancing by connecting two of its wires in series in the sides one of the pairs to be balanced and the other two of its wires in series in the sides of the other pair. This practice is shown at the lower right part of Fig. 6, between positions 10 and 7.

As far as I went with the discussion of the general theory in connection with Fig. 1, the inference would be that the local balancing units could be placed with substantially the same effect at any convenient point in the line; that is, the introduction of a small cross capacity or cross mutual inductance from one line to the other will give the same current at the far end of the disturbed circuit wherever the cross connection be made along the line. However, this assumes that the two circuits are each exactly terminated in their characteristic impedances. In practice this will seldom be the case, and it is this irregularity of the impedance termination that makes it more effective to connect the balancing unit at or near the center of the line. In Fig. 12 two conductor pairs are shown with couplings $c_1$ at the near end and $c_2$ at the far end. The ends of the two circuits are terminated as shown in the impedances $Z_1$, $Z_2$, $Z_3$ and $Z_4$, each of which is assumed to be somewhat different from the corresponding characteristic impedance of the line. The fact that $Z_1$ is different from the characteristic impedance changes all the crosstalk currents resulting from the various couplings, both those that are accidentally present initially and those that are introduced intentionally to make correction. But the change referred to is not a change of relative magnitudes nor of phase relations. Therefore, the balance can be effected by a single balancing unit in spite of the irregularity at $Z_1$. A similar exposition applies for the impedance $Z_4$ at the receiving end of the disturbed circuit. But if the impedance $Z_2$ is different from the characteristic impedance, a portion of the normal arriving current $I_1$ will be reflected. Represent this reflected component as $I_r$. This traverses the line in the opposite direction, causing additional crosstalk current through the couplings $c_1$ and $c_2$. This reflected current will make only a small addition to the crosstalk current resulting from $c_1$ because it will be so much attenuated in going the length of the circuit from right to left and back from left to right; but its addition to the crosstalk current due to $c_2$ may be considerable. Thus, the crosstalk current due to $c_2$ may be so changed in phase and magnitude as to be no longer balanced by a local capacity connected at the left end of the line.

The effect of having the impedance $Z_3$ somewhat different from the characteristic impedance will cause the crosstalk current due to the coupling $c_1$ to change in phase and magnitude. Whether $Z_3$ matches the characteristic impedance or not, the coupling $c_1$ results in currents $I_n$ and $I_f$, respectively, toward the two ends of the line. The current $I_f$ appears as a far-end crosstalk current at the receiving end of the disturbed circuit. The current $I_n$ would be absorbed at the left end of the disturbed circuit if it were there terminated in its characteristic impedance. But not being so terminated, a component of the current $I_n$ is reflected and transmitted to the receiving end of the distributed circuit, thereby changing the phase and magnitude of the total crosstalk current due to the coupling $c_1$.

Since the couplings between the two circuits are distributed, most of them are remote from the ends, and the total crosstalk current will be little affected by moderate departures of the terminating impedances from the proper characteristic impedance values. If the introduced local balancing units are connected at the center of the line, their crosstalk currents will also be little affected by the termination of the circuits, and the crosstalk current caused thereby can be made substantially to annul the crosstalk current caused by the accidental couplings between the circuits and not near their ends. If the local balancing unit were connected near one end of the line, the phase and magnitude of the crosstalk current caused by this unit might be considerably affected by the irregular termination at that end of the line, and in that case the balancing unit would give substantial annulment of crosstalk currents only for such currents, due to couplings near the corresponding end of the line. Thus, it will be seen that on the whole the most advantageous point at which to introduce the compensating couplings is a point about half-way along the length of the conductor pairs, as stated in connection with Fig. 5.

A system of balancing such as described in connection with Figs. 1 and 5 may be employed advantageously, with some modification, to reduce the crosstalk between well transposed open wire circuits. The gain that can be accomplished in this way is indicated by the curve diagram of Fig. 13. Since open wire circuits cannot be as frequently and regularly transposed as cable pairs are twisted, the crosstalk will depend somewhat on the arrangement of the transpositions and not alone on accidental irregularities, as for the case of crosstalk in the cable. For this reason and the further reason that the crosstalk between open wire circuits is variable with weather conditions, local balancing for open wire circuits may not be as effective as in the case of cable circuits. Nevertheless, substantial and worthwhile reductions of crosstalk can be attained and maintained by local balancing, somewhat in the manner that I have described for cable circuits.

Two open wire circuits are shown in Fig. 14 with local balancing at the near end by means of adjustable mutual inductance $m$ and adjustable capacity $c$. Both capacity and inductance are shown for the reason that by their use the correcting current can be minimized at the near end of the disturbed circuit while remaining effective at the far end, and thus an irregularity in impedance value $Z_s$ can be minimized in its effect on the crosstalk current at the far end of the disturbed circuit. The explanation of this is as follows:

If the components of current in the disturbed circuit due respectively to the inductance and capacity are represented by $A_m$ and $B_c$, the connections may be such that to the right these components will be nearly in phase whereas to the left they will be nearly in opposition, as shown respectively in Figs. 16 and 15. Accordingly, if the inductance $m$ and capacity $c$ are adjusted to produce the smallest possible current at the near end, as in Fig. 15, then the far-end current due to these couplings will be of considerable value and intermediate in angle between that due to mutual inductance alone and that due to capacity alone. These angular differences will be very small, much smaller at any given frequency for open wire than for cable. Hence, by adjusting both the capacity $c$ and the mutual inductance $m$ and maintaining the proper ratio between them, the correcting far-end crosstalk current due to the introduced balancing unit $m$, $c$ may be made to vary in magnitude and have the proper value, as desired, without introducing large crosstalk currents at the near end of the disturbed circuit, even though there may be some impedance irregularity at that point.

For well transposed open wire circuits having large crosstalk values, it has been found that mutual inductance or capacity coupling predominates. The resultant far-end crosstalk current due to the balancing units can, therefore, be made approximately to annul the original crosstalk current in the manner that has been indicated heretofore in Fig. 3; for this introduced current component can be approximately 180° out of phase with the original crosstalk current by a proper choice of the wires of the two circuits between which to connect the balancing unit. The use of capacity and inductance at one end of the circuit instead of at or near its middle point may be slightly less effective, but on the other hand, the number of circuits together in the case of open wire lines is usually less and the greater convenience of making the compensations at one end of the common length of the lines instead of at the middle will probably outweigh the advantage that would be gained by having them at the middle. Since open wire crosstalk is relatively unstable, and relatively few balancing units will be used, it is probable that the cost of placing and maintaining the balancing units at the center of the line will not be warranted. Except for this difference of location the balancing units to reduce crosstalk between pairs of an open wire line may be similar to those used for the cable.

I claim:

1. A cable of a certain length comprising a plurality of conductor pairs therein and means located half-way along said length and connected across between conductors of certain pairs and conductors of certain other pairs to neutralize the crosstalk between those pairs.

2. A plurality of conductor pairs extending together along a certain length and reactance elements located half-way along that length and each connected across between a conductor of one pair and a conductor of another pair to neutralize the crosstalk between such pairs.

3. A plurality of conductor pairs extending together a certain length and means for neutralizing crosstalk comprising a panel located half-way along said length, each pair being brought to a plurality of positions on said panel with, in general, as many as six different other pairs adjacent at each such position whereby each pair will be adjacent to each other pair at some one position.

4. A plurality of conductor pairs extending together and means for correcting crosstalk between said pairs comprising a panel with each pair brought to a plurality of positions thereon and with different other pairs on all sides at each such position, whereby each pair will be adjacent to each other pair at some one position and the total number of positions will not be greater than necessary.

5. Means to facilitate compensation for crosstalk between neighboring conductor pairs comprising a panel with positions arranged in columns and rows, each conductor pair being brought to a plurality of these positions and at each position having different other conductor pairs adjacent above, below, right, left, diagonally one way and diagonally the opposite way.

6. The combination of claim 5 and in combination therewith adjustable reactance elements adapted to be connected between the adjacent positions mentioned in claim 5 whereby the different reactance elements will be spaced from one another to obviate the introduction of mutual effects between them.

7. The combination of claim 5 with each conductor at each position carried through a plurality of soldering lugs in sequence, a capacity connected from a lug at one position to a lug at a neighboring position and a mutual inductance with one coil connected between two lugs of one conductor at one position and the other coil connected between two lugs of one conductor at an adjacent position.

8. A cable comprising twisted pairs and twisted quads laid in coaxial layers, each layer comprising pairs and quads disposed alternately around the layer, the pairs and quads of one layer having a like uniform helical course along and round the cable axis, this course being alternately right and left from layer to layer across the axis of the cable.

9. Means to balance crosstalk between adjacent conductor pairs consisting of an adjusted length of spiral—4 conductor with two adjacent conductors of the spiral—4 connected respectively to two sides of one pair and the other two conductors connected respectively to the two sides of the other pair.

10. Means to balance crosstalk between adjacent conductor pairs consisting of an adjusted length of spiral—4 conductor, with two adjacent conductors of the spiral—4 connected to branch respectively from the two sides of one pair and the other two conductors of the spiral—4 connected to branch respectively from the two sides of the other pair.

11. Means to balance crosstalk between adjacent conductor pairs consisting of an adjusted length of spiral—4 conductor, with two adjacent conductors of the spiral—4 connected to be interposed respectively in two sides of one pair and the other two conductors of the spiral—4 connected to be interposed respectively in the two sides of the other pair.

12. The method of compensating for crosstalk between conductor pairs extending together over a certain length which consists in placing an adjustable impedance across from one side of one pair to one side of another pair at the middle point of said length, then adjusting this impedance to the component values that give substantial elimination of the crosstalk and then permanently interposing measured impedance elements of values determined by said adjustment.

13. The method of compensating for crosstalk between conductor pairs extending together over a certain length which consists in carrying the crosstalk from the far end of the disturbed circuit to the middle point of the said length and listening to it there, then making an impedance bridge adjustment across the four conductors of the disturbed and disturbing circuits at the middle point, adjusting the bridge until the crosstalk is reduced to a minimum and then interposing permanent impedance elements between the conductors of the two circuits as determined by the bridge adjustment.

14. In the installation and operation of a plurality of conductor pairs extending together a certain distance, the method of compensating for crosstalk between the pairs taken two at a time which consists in terminating each of two such pairs at each of its ends by its characteristic impedance, applying a high frequency current at one end of one pair, heterodyning and detecting for the crosstalk at the opposite end of the other pair, transmitting the detected output current to the middle point of the said distance and listening to it there, and introducing and adjusting impedance across the two pairs at the said middle point to neutralize the crosstalk.

15. In the installation and operation of a pair of metallic circuits extending side by side with each circuit terminated at each end by approximately its characteristic impedance, the method of reducing crosstalk with a minimum of disturbance due to inexact values of the terminating impedances which consists in connecting and adjusting impedance elements across from circuit to circuit at the middle point of their common extent, whereby the disturbing effect of current reflections at the terminating impedances is minimized.

16. In the installation and operation of a plurality of conductor pairs extending a certain distance, the method of reducing crosstalk which consists in appropriating one of the pairs as an order circuit with operators therein at each end and at the middle of said distance, the operator at one end applying a high frequency generator to one pair and a characteristic impedance to this pair and another pair as directed by the middle operator, the operator at the other end applying a heterodyne detector to his end of said other pair and characteristic impedances across his ends of both pairs, sending the output of the said detector over still another pair appropriated for the purpose to a head-set on the operator at the middle, and this operator accordingly interposing impedance elements across the two pairs under test and adjusting them until the crosstalk is annulled, as indicated in his said head-set.

17. In combination with a plurality of conductor pairs extending together a certain distance, means to neutralize crosstalk comprising a panel adjacent thereto with the various conductor pairs brought to various positions thereon so that between each and every pair of conductor pairs reactance elements can be interposed with short leads and spaced from one another.

18. In combination, a pair of circuits extending side by side and means to balance them for crosstalk comprising both inductance and capacity connected across from one circuit to the other at the near end and poled so that the resultant current components set up in the disturbed circuit will be nearly in the same phase at the far end but nearly in opposite phase at the near end, whereby the disturbing effect of an imperfect impedance termination at the near end of the disturbed line will be minimized.

19. The method of neutralizing far end crosstalk between two circuits which consists in connecting both inductance and capacity across between the two circuits at the near end, poling the connections and making these elements of such magnitude that the current components due thereto will add nearly in phase to give the proper resulting correcting components of current at the far end but will add nearly in opposite phase to give only a small current at the near end of the disturbed circuit, whereby the effect of an imperfection of impedance termination at the said near end will be minimized at the far end.

In testimony whereof, I have signed my name to this specification this 2nd day of December, 1930.

ARTHUR G. CHAPMAN.